May 19, 1925.  1,538,229

J. P. WEAVER

GLASS FURNACE

Filed April 7, 1924

INVENTOR
James P. Weaver
BY C. A. Rowley
ATTORNEY

Patented May 19, 1925.

1,538,229

UNITED STATES PATENT OFFICE.

JAMES P. WEAVER, OF CHARLESTON, WEST VIRGINIA, ASSIGNOR TO THE LIBBEY-OWENS SHEET GLASS COMPANY, OF TOLEDO, OHIO, A CORPORATION OF OHIO.

GLASS FURNACE.

Application filed April 7, 1924. Serial No. 704,612.

*To all whom it may concern:*

Be it known that I, JAMES P. WEAVER, a citizen of the United States, residing at Charleston, in the county of Kanawha and State of West Virginia, have invented new and useful Improvements in Glass Furnaces, of which the following is a specification.

This invention relates to the art of supplying molten glass to a glass-working machine.

In many glass-working systems, particularly systems for drawing glass in continuous sheet form, the glass-producing materials are melted in one end of a continuous tank furnace through which the glass slowly flows to the pot or receptacle from which the sheet or other article is drawn. This movement of the glass is mostly limited to the uppermost strata and it is imperative to remove all dirt and other impurities from the surface glass, which glass passes directly into the article to be produced. For this reason it is customary to provide skimming holes in the sides of the tank at intermediate points, through which workmen insert iron rakes or ladles and draw out the objectionable portions of the surface glass.

According to the present invention, overflow passages are provided in the opposite sides of the tank at points intermediate its length through each of which a thin stream of the surface glass is allowed to continuously flow. Since there is a tendency for the dirt and other impurities to collect along the sides of the tank most of this material will be carried directly out upon these overflow streams. Besides providing an automatic method for carrying out this skimming process, this system has further advantages. The additional surface streams flowing through the sides of the pot tend to produce a wider stream flow through the tank and overcome the tendency of the main flow to concentrate in the central portions of the tank and allow the side portions to stagnate. The overflow passages tend to provide a constant glass level in the tank and hence in the working receptacle from which the glass articles are produced. The glass from the overflow streams, which is allowed to run into tanks of water, provides a supply of cullet which is an essential ingredient of the mixture for making the molten glass.

The objects and advantages of the invention will be better understood from the following detailed description of one approved form of the apparatus.

Figure 1:
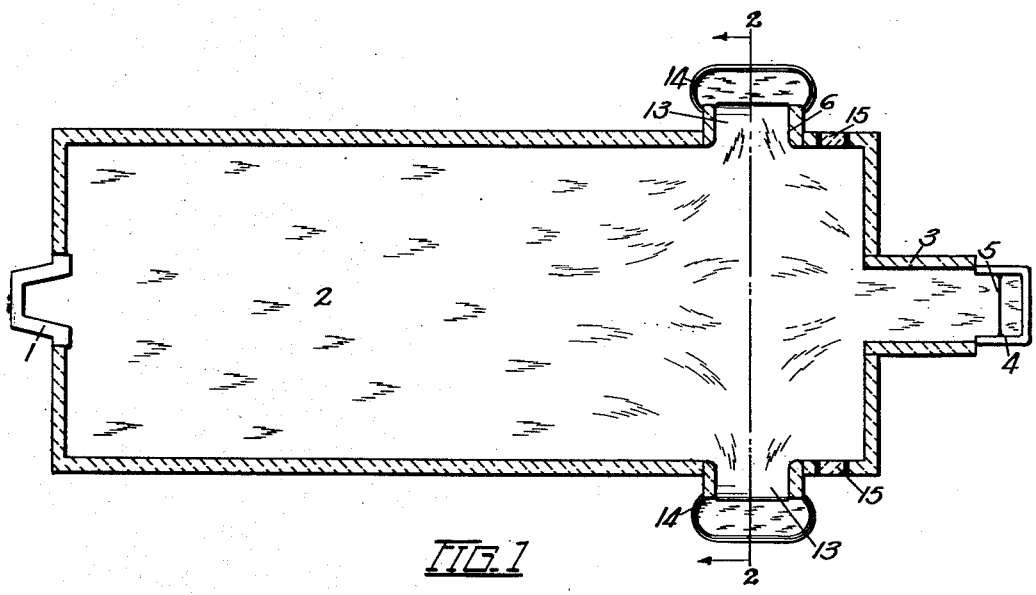
Fig. 1 is a horizontal section through the furnace taken slightly above the glass level.
Figure 2:
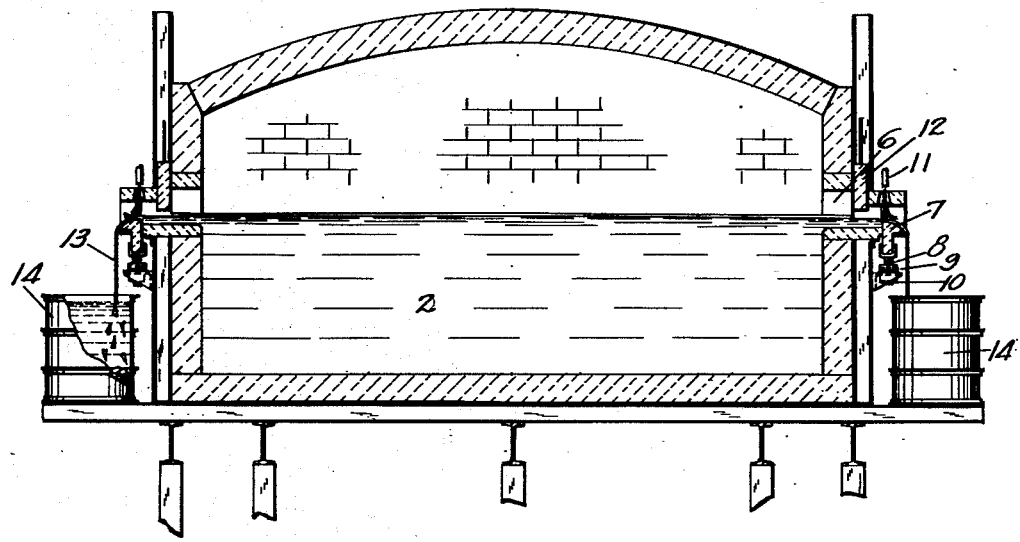
Fig. 2 is a transverse vertical section taken substantially on the line 2—2 of Fig. 1.

The glass making materials are inserted into the tank through the dog-house 1, at the left of Fig. 1. After being melted in this end of the furnace, the molten glass 2 flows slowly through the refining portion of the tank, thence through the cooling chamber 3 into the working receptacle or draw-pot 4 from which the glass sheet 5 or other article is drawn.

At suitable points in the opposite side portions of the tank, in the refining end thereof, passages 6 are provided extending somewhat below the normal glass level through which a part of the surface glass may flow out. A vertically adjustable block 7 is positioned at the outlet end of each passage to regulate the depth of the stream that is allowed to flow out through passage 6. Each block as here shown is mounted on an adjusting screw 8 whose vertical position is controlled by the adjusting nut 9, the block and screw being supported by a suitable fixed bracket 10. Burners 11 play upon the molten stream flowing through passage 6 to maintain same at such a temperature that it will flow freely. The overflow streams may be partially or entirely cut off if desired by means of vertically adjustable plugs or shear-cakes 12. The molten streams 13, from these passages, flow into a tank of water 14 positioned outside of the furnace wherein the molten glass is converted into cullet.

Most of the dirt and other impurities on the surface glass normally works its way toward the side portions of the furnace, and the greater portion of this material will be carried out upon the thin streams 13 constantly flowing through the outlet passages 6. Any large chunks of dog-metal or other material that may fail to pass out through these overflow passages may be manually removed by skimming tools through one of the holes 15 provided near the discharge end of the tank.

This construction not only provides a constant automatic means for skimming the surface glass, but also acts to spread the surface flow and provide more movement in the otherwise more or less stagnant glass along the sides of the tank. This wider flow not only increases the productive capacity of the tank but also keeps the entire mass of glass in the tank in a more homogeneous condition and tends to prevent the formation of dog-metal or devitrified glass. Also the overflow passages act as an automatic means for maintaining a substantially normal glass level in the tank and working receptacle 4. The cullet formed in the tanks 14 is not wasted but may be used again since cullet is one of the essential ingredients of the glass-producing mixture.

Claims:

1. The process of supplying molten glass to a glass-working machine, consisting in melting the glass, flowing the molten glass through a tank to the machine, and at an intermediate point along the side of the flowing stream allowing a portion of the surface glass to flow out and form cullet.

2. The process of supplying molten glass to a glass-working machine, consisting in melting the glass, flowing the molten glass through a tank to the machine, and at intermediate points on opposite sides of the flowing stream allowing portions of the surface glass to flow out and form cullet.

3. A glass tank in which glass is melted and flowed to a glass-working machine, the tank having an overflow passage at an intermediate point through which surface glass is allowed to flow.

4. A glass tank in which glass is melted and flowed to a glass-working machine, the tank having overflow passages at opposite points in the sides of the tank through which surface glass is continuously allowed to flow.

5. A glass tank in which glass is melted and flowed to a glass-working machine, the tank having an overflow passage at an intermediate point through which surface glass is allowed to flow, and means for controlling the depth of flow through the passage.

6. A glass tank in which glass is melted and flowed to a glass-working machine, the tank having an overflow passage at an intermediate point through which surface glass is allowed to flow, means for controlling the depth of flow through the passage, and means for heating the glass in the passage.

Signed at Charleston, in the county of Kanawha, and State of West Virginia, this 3rd day of April, 1924.

JAMES P. WEAVER.